(12) United States Patent
Yan

(10) Patent No.: US 7,847,875 B2
(45) Date of Patent: Dec. 7, 2010

(54) ANTI-INTERFERENCE WIRING ASSEMBLY FOR LIQUID CRYSTAL DISPLAY DEVICE AND METHOD FOR REDUCING INTERFERENCE

(75) Inventor: Shuo-Ting Yan, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 748 days.

(21) Appl. No.: 11/784,884

(22) Filed: Apr. 9, 2007

(65) Prior Publication Data

US 2007/0236620 A1 Oct. 11, 2007

(30) Foreign Application Priority Data

Apr. 7, 2006 (TW) ............................... 95112476 A

(51) Int. Cl.
G02F 1/1333 (2006.01)
(52) U.S. Cl. .................... 349/54; 349/192; 349/139; 349/33
(58) Field of Classification Search .................... 349/54, 349/192, 139, 111, 110, 38, 33; 345/87, 345/90, 92, 93, 94
See application file for complete search history.

(56) References Cited

U.S. PATENT DOCUMENTS

| 5,726,678 | A | 3/1998 | Dingwall |
| 5,997,562 | A | 12/1999 | Zadno-Azizi et al. |
| 6,020,870 | A * | 2/2000 | Takahashi et al. ............. 345/92 |
| 6,268,617 | B1 | 7/2001 | Hirakata et al. |
| 6,621,102 | B2 | 9/2003 | Hirakata et al. |
| 6,770,909 | B2 * | 8/2004 | Murade ....................... 257/59 |
| 2004/0108985 | A1 | 6/2004 | Song |

FOREIGN PATENT DOCUMENTS

| CN | 1096052 C | 12/2002 |
| CN | 1506720 A | 6/2004 |

* cited by examiner

Primary Examiner—Thoi V Duong
(74) Attorney, Agent, or Firm—Wei Te Chung

(57) ABSTRACT

An exemplary anti-interference wiring assembly for a liquid crystal display device includes a base substrate (210), gate lines (201) formed at the base substrate, anti-interference wires (230), and data lines (202). The anti-interference wires are provided between the gate lines and the data lines and are insulated from the gate lines and the data lines respectively. The anti-interference wires are configured for carrying signals having a reverse phase compared to signals carried by the corresponding gate lines.

20 Claims, 3 Drawing Sheets

ANTI-INTERFERENCE WIRING ASSEMBLY FOR LIQUID CRYSTAL DISPLAY DEVICE AND METHOD FOR REDUCING INTERFERENCE

BACKGROUND OF THE INVENTION

1. Field of the Invention

The invention relates to anti-interference wiring structures for reducing electrical signal interference, and particularly to an anti-interference wiring structure for a liquid crystal display (LCD) device and a method for reducing signal interference in an LCD device.

2. General Background

Liquid crystal displays (LCDs) generally have advantages of lightness in weight, a thin profile, flexible sizing, and low power consumption. For these reasons, LCDs are widely used in products such as laptops, personal digital assistants, mobile phones, and so on.

An LCD device forming part of an LCD usually includes a color filter (CF) substrate, a thin film transistor (TFT) substrate, and a liquid crystal layer interposed between the two substrates. The TFT substrate is set with a plurality of parallel gate lines and a plurality of parallel data lines. The gate lines and data lines cross one another and are electrically insulated from one another.

Referring to FIG. 5, this is a schematic, top plan view of certain parts of a conventional TFT substrate. The TFT substrate 100 includes a plurality of parallel gate lines 101, a plurality of parallel data lines 102, and a plurality of TFTs 103. The gate lines 101 and the data lines 102 cross one another and are insulated from one another. Thus the gate lines 101 and data lines 102 form a kind of grid, with units of the grid being defined as pixel units 104. Each of the TFTs 103 is set near a respective crossing of the gate lines 101 and the data lines 102. Furthermore, each TFT 103 electrically connects to the corresponding gate line 101 and the corresponding data line 102, respectively.

FIG. 6 illustrates a cross-sectional view corresponding to line VI-VI of FIG. 5. The gate lines 101 are formed on a base substrate 110. An insulating layer 120 is deposited on the gate lines 101, and the data lines 102 are formed on the insulating layer 120. Parts of the data lines 102 overlap the gate lines 101. When one row of the pixel units 104 is selected to have a scanning signal applied thereto through the corresponding gate line 101, data signals are also applied to the selected pixel units 104 through the data lines 102 simultaneously.

Because overlapping regions exist as between the data lines 102 and gate lines 101, interference is liable to occur therebetween when the scanning signal is applied to each gate line 101 and the data signals are applied to the data lines 102 individually. This kind of interference is sometimes referred to as 'cross talk'. The interference can cause distortion of the data signals applied to the data lines 102, and adversely impact the quality of images displayed by a display device employing the TFT substrate 100.

SUMMARY

An exemplary anti-interference wiring assembly for a liquid crystal display device includes a base substrate, a plurality of gate lines formed at the base substrate, a plurality of anti-interference wires and a plurality of data lines. The anti-interference wires are provided between the gate lines and the data lines and insulated from the gate lines and the data lines respectively. In order to reduce signal interference, the anti-interference wire is configured for carrying signal having a reverse phase compared to the signal carried by the corresponding gate line.

Furthermore, there are various ways to configure and utilize the anti-interference wiring assembly to help ensure reduction of interference. For example, a distance between the anti-interference wire and the gate lines is less than a distance between the anti-interference wire and the data lines. A width of the anti-interference wire is smaller than that of the gate lines. An absolute value of the signal applied to the anti-interference wire is smaller than that of the signal applied to the gate lines.

An exemplary method for reducing signal interference in liquid crystal display device includes the following steps: (a) providing a first and a second conductive lines; (b) providing an anti-interference wire interposed between the first and the second conductive lines wherein the anti-interference wire being insulating from the first and the second conductive lines; (c) providing a signal to the anti-interference wire; and (d) providing a signal to the first conductive line. The signal provided to the anti-interference wire and the signal provided to the first conductive line are provided substantially simultaneously. Moreover, the signal applied to the anti-interference wire has a reverse phase compared to the signal applied to the first conductive line.

Other novel features and advantages of the above-described structures and method will become more apparent from the following detailed description when taken in conjunction with the accompanying drawings, in which:

DETAILED DESCRIPTION OF PREFERRED EMBODIMENTS

Figure 1:
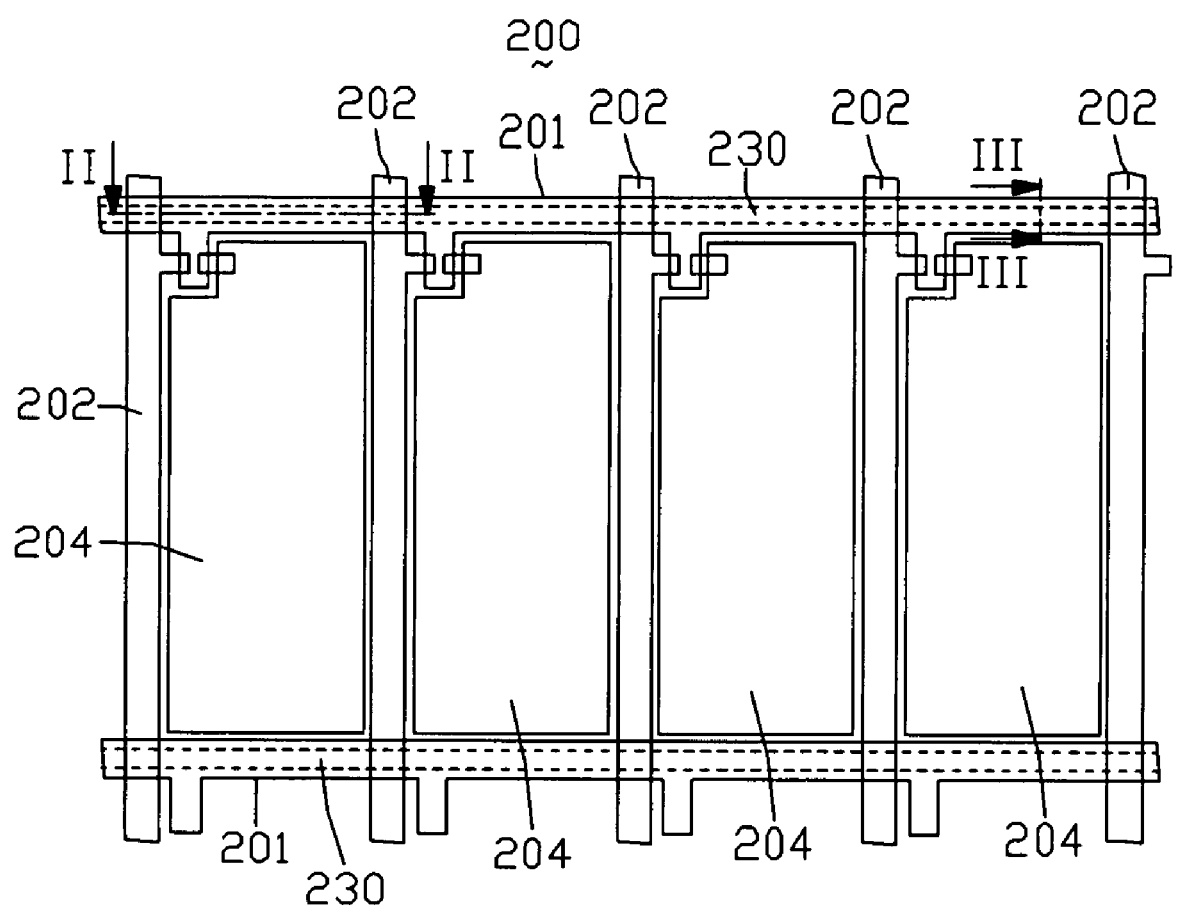
FIG. 1 is a schematic, top plan view of certain parts of a thin film transistor (TFT) substrate of a liquid crystal display (LCD) device according to an exemplary embodiment of the present invention.
Figure 2:
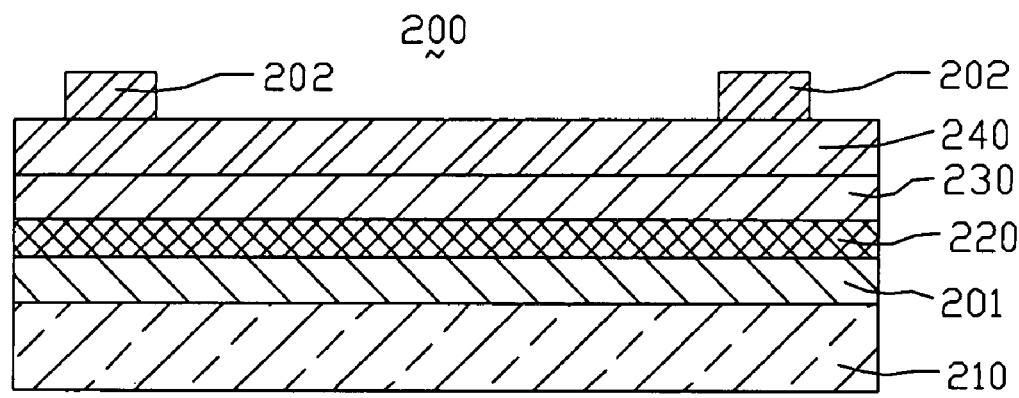
FIG. 2 is a cross-sectional view corresponding to line II-II of FIG. 1.

Referring to FIGS. 1 and 2, these show aspects of part of a thin film transistor (TFT) substrate of a liquid crystal display (LCD) device according to an exemplary embodiment of the present invention. The TFT substrate 200 includes a base substrate 210, a plurality of parallel gate lines 201, a plurality of parallel anti-interference wires 230, and a plurality of parallel data lines 202. The base substrate 210 is typically made of glass. The gate lines 201 orthogonally cross the data lines 202 to define a plurality of pixel units 204. In the illustrated embodiment, the gate lines 201 are formed directly on the base substrate 210. The gate lines 201 can be made of any suitable electrically conductive material, such as metal and/or alloy. The metal can for example be tungsten (W) or molybdenum (Mo), and the alloy can for example be aluminum-neodymium alloy (AlNd). Then a first insulating layer 220 is formed over the gate lines 201. Subsequently, a plurality of anti-interference wires 230 are formed on the first insulating layer 220, corresponding to the gate lines 201. Thus, the first insulating layer 220 isolates the gate lines 201 and the anti-interference wires 230 from each other. The anti-interference wires 230 can be made of any suitable electrically conductive material such as metal or indium tin oxide (ITO).

Afterward, a second insulating layer 240 is formed over the anti-interference wires 230. In a preferred embodiment, each of the insulating layers 220 and 240 can be made of any suitable dielectric material such as silicon dioxide ($SiO_2$), silicon nitride ($Si_3N_4$), silicon oxynitride (SiON), phosphosilicate glass (PSG), borosilicate glass (BSG), borophosphosilicate glass (BPSG), fluorinated silicate glass (FSG), etc. Thereafter, the data lines 202 are formed on the second insulating layer 240. The data lines 202 can be made of any suitable electrically conductive material, such as metal. The metal can for example be molybdenum (Mo).

In the preferred embodiment, each of the anti-interference wires 230 is formed directly above a corresponding one of the gate lines 201, as shown in FIG. 1. The anti-interference wires 230 can be made of any suitable electrically conductive material, such as metal and/or alloy. The metal can for example be tungsten (W) or molybdenum (Mo), and the alloy can for example be aluminum-neodymium alloy (AlNd). Each anti-interference wire 230 is electrically connected to a signal source (not shown). A signal applied to the anti-interference wire 230 by the signal source has a reverse phase compared to a corresponding scanning signal applied to the gate line 201. In the preferred embodiment, the signal applied to the anti-interference wire 230 comes from a gate driver (not shown) of the LCD device through an inverter (not shown) of the LCD device, such that the scanning signal applied to the gate line 201 has a reverse phase compared to the signal applied to the anti-interference wire 230. Furthermore, an absolute value of the signal applied to the anti-interference wire 230 is smaller than an absolute value of the scanning signal applied to the gate line 201.

Figure 3:
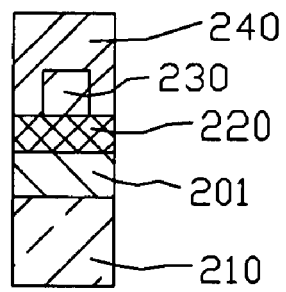
FIG. 3 is a cross-sectional view corresponding to line III-III of FIG. 1.

Also referring to FIG. 3, preferably, a width of the anti-interference wire 230 is less than a width of the gate line 201. Further, a distance between the anti-interference wire 230 and the gate line 201 is less than a shortest distance between the anti-interference wire 230 and each of the data lines 202. This configuration can improve the effect of the signal from the signal source applied to the anti-interference wire 230 in helping to avoid interference of the scanning signal applied to the gate line 201.

Figure 4:
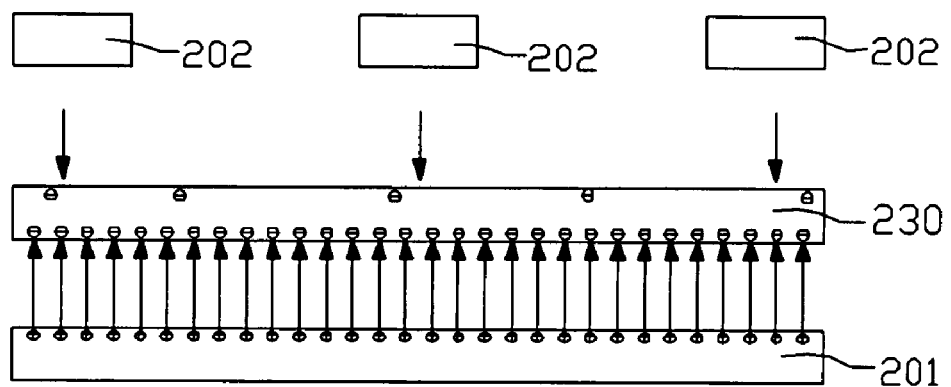
FIG. 4 is a schematic, side view similar to FIG. 2, illustrating a theory of lowering of interference by an anti-interference wiring structure of the TFT substrate of FIG. 1.
Figure 5:
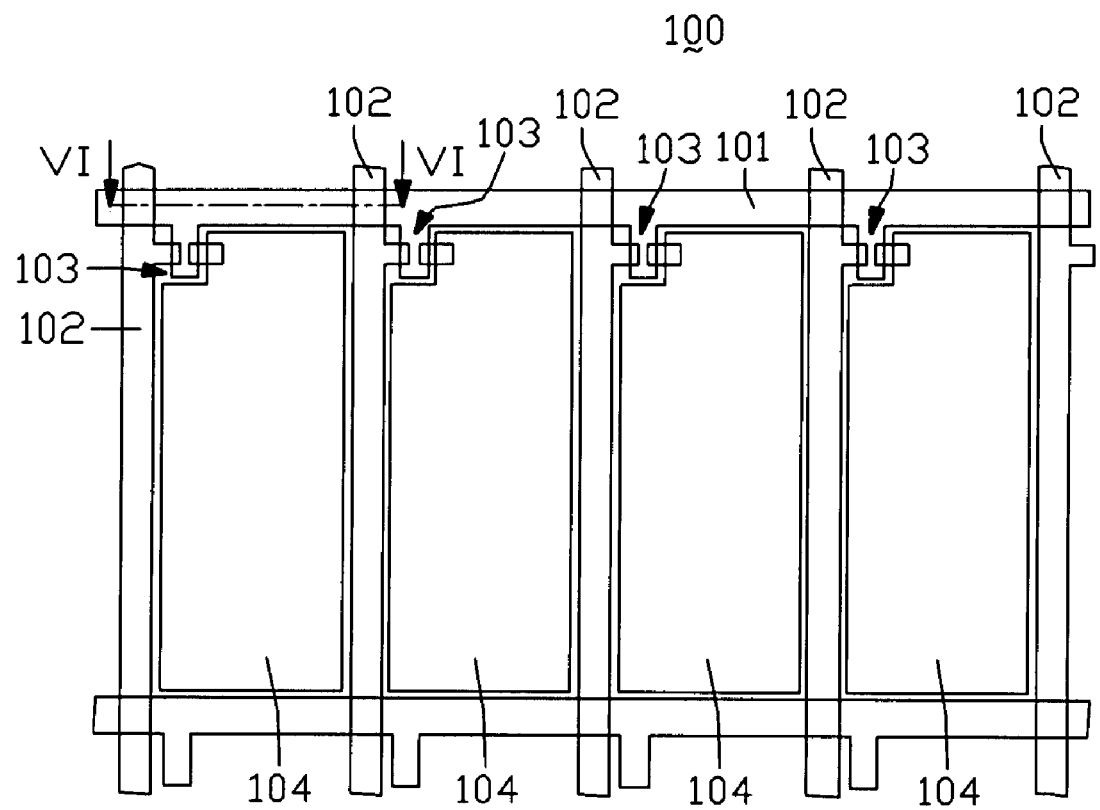
FIG. 5 is a schematic, top plan view of certain parts of a conventional TFT substrate
Figure 6:
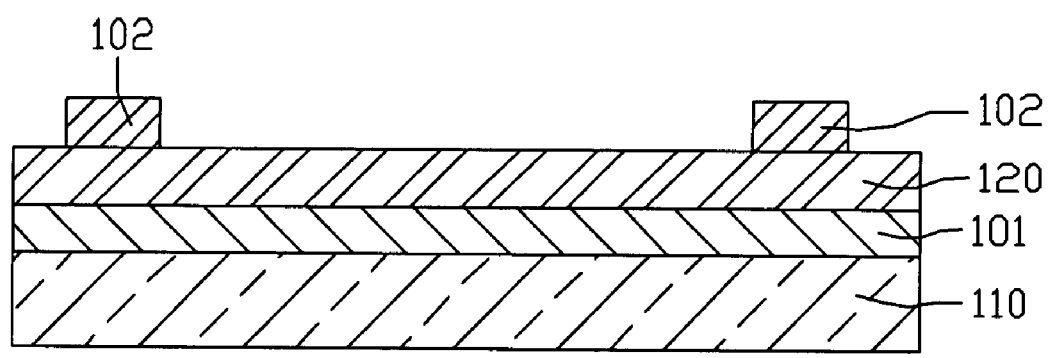
FIG. 6 is a cross-sectional view corresponding to line VI-VI of FIG. 5.

The function of the anti-interference wires 230 is to avoid interference of data signals applied to the data lines 202, which interference may be induced by the scanning signals applied to the gate lines 201. FIG. 4 illustrates a theory of lowering of interference by an anti-interference wiring structure that includes the anti-interference wires 230. When a positive voltage signal is applied to the gate line 201 shown, a corresponding negative voltage signal is applied to the anti-interference wire 230 shown. Therefore, an electric field is formed between the gate line 201 and the anti-interference wire 230. Due to the electric field, negative electric charge particles within the anti-interference wire 230 are induced to migrate to a side of the anti-interference wire 230 facing the gate line 201. Therefore, few negative electric charge particles are distributed near a side of the anti-interference wire 230 facing the data lines 202. Consequently, weak electric fields are formed between the side of the anti-interference wire 230 facing the data lines 202 and the data lines 202 respectively. Thereby, interference of data signals applied to the data lines 202 due to a scanning signal applied to the gate line 201 is reduced.

In summary, unlike in a conventional TFT substrate, the TFT substrate 200 has the anti-interference wires 230 interposed between the gate lines 201 and the data lines 202. A voltage signal applied to each anti-interference wire 230 has an opposite phase to the voltage signal applied to the corresponding gate line 201. Therefore, a weaker electric field exists at each of the data lines 202 where the data line 202 is near each gate line 201 and the corresponding anti-interference wire 230. Thereby, interference of data signals in the data lines 202 generated by scanning signals in the gate lines 201 is effectively reduced.

As would be understood by a person skilled in the art, the foregoing preferred and exemplary embodiments are provided in order to illustrate principles of the present invention rather than limit the present invention. The above descriptions are intended to cover various modifications and similar arrangements and procedures included within the spirit and scope of the appended claims, which scope should be accorded the broadest interpretation so as to encompass all such modifications and similar structures and methods.

What is claimed is:

1. An anti-interference wiring assembly for a liquid crystal display device, the anti-interference wiring assembly comprising:
   a substrate;
   a plurality of gate lines formed at the substrate;
   a plurality of anti-interference wires formed at the substrate corresponding to the gate lines and insulated from the gate lines; and
   a plurality of data lines formed at the substrate, the data lines crossing the anti-interference wires and insulated from the anti-interference wires;
   wherein the anti-interference wires are located generally between the gate lines and the data lines, and are configured for carrying signals having a reverse phase compared to signals carried by the corresponding gate lines, and an absolute value of a signal carried by each of the anti-interference wires is less than that of a corresponding signal carried by the corresponding gate line.

2. The anti-interference wiring assembly as claimed in claim 1, wherein a distance between each of the anti-interference wires and the corresponding gate line is less than a shortest distance between the anti-interference wire and each of the data lines.

3. The anti-interference wiring assembly as claimed in claim 1, further comprising a first insulating layer formed between the anti-interference wires and the gate lines.

4. The anti-interference wiring assembly as claimed in claim 3, further comprising a second insulating layer formed between the anti-interference wires and the data lines.

5. The anti-interference wiring assembly as claimed in claim 1, wherein the phase of the signals carried by the anti-interference wires is reversed to that of the signals carried by the corresponding gate lines anytime.

6. The anti-interference wiring assembly as claimed in claim 5, wherein each of the anti-interference wire is formed above a corresponding one of the gate lines.

7. The anti-interference wiring assembly as claimed in claim 6, wherein the anti-interference wire is made of one selected from the group consisting of tungsten, molybdenum, and aluminum-neodymium alloy.

8. An anti-interference wiring assembly for a liquid crystal display device, the anti-interference wiring assembly comprising:
   a substrate;
   a plurality of gate lines formed at the substrate;

a plurality of anti-interference wires formed at the substrate corresponding to the gate lines and insulated from the gate lines; and a plurality of data lines formed at the substrate, the data lines crossing the anti-interference wires and insulated from the anti-interference wires;

wherein the anti-interference wires are located generally between the gate lines and the data lines, and are configured for carrying signals having a reverse phase compared to signals carried by the corresponding gate lines, and a width of each of the anti-interference wires is less than that of the corresponding gate line.

9. A method for reducing signal interference in a liquid crystal display device, the method comprising:

providing a first conductive line and a second conductive line;

providing an anti-interference wire interposed between the first and second conductive lines, the anti-interference wire being insulating from the first conductive line and the second conductive line;

providing a signal to the anti-interference wire; and providing a signal to the first conductive line;

wherein the signal applied to the anti-interference wire has a reverse phase compared to the signal applied to the first conductive line, and an absolute value of a signal carried by each of the anti-interference wires is less than that of a corresponding signal carried by the corresponding first conductive line.

10. The method as claimed in claim 9, wherein the signal provided to the anti-interference wire and the signal provided to the first conductive line are provided substantially simultaneously.

11. The method as claimed in claim 9, wherein a distance between each of the anti-interference wires and the corresponding first conductive line is less than a shortest distance between the anti-interference wire and each of the second conductive lines.

12. The method as claimed in claim 9, wherein the anti-interference wire is formed above the first conductive line.

13. The method as claimed in claim 12, wherein the phase of the signal applied to the anti-interference wire is reversed to that of the signal applied to the corresponding first conductive line anytime.

14. A method for reducing signal interference in a liquid crystal display device, the method comprising:

providing a first conductive line and a second conductive line;

providing an anti-interference wire interposed between the first and second conductive lines, the anti-interference wire being insulating from the first conductive line and the second conductive line;

providing a signal to the anti-interference wire; and providing a signal to the first conductive line;

wherein the signal applied to the anti-interference wire has a reverse phase compared to the signal applied to the first conductive line, and a width of each of the anti-interference wires is less than that of the corresponding gate line.

15. An anti-interference wiring assembly for a liquid crystal display device, the anti-interference wiring assembly comprising:

a substrate;

a plurality of first conductive lines formed at the substrate;

a plurality of anti-interference wires insulated from the first conductive lines; and a plurality of second conductive lines insulated from the anti-interference wires;

wherein a first signal and a second signal are respectively applied to one of the first conductive lines and a corresponding one of the anti-interference wires, and the first signal has a reversed phase compared to that of the second signal anytime.

16. The anti-interference wiring assembly as claimed in claim 15, wherein an absolute value of a signal applied to each of the anti-interference wires is less than that of a corresponding signal applied to the corresponding first conductive line.

17. The anti-interference wiring assembly as claimed in claim 16, wherein a width of each of the anti-interference wires is less than that of the corresponding first conductive line.

18. The anti-interference wiring assembly as claimed in claim 17, wherein the anti-interference wires are located generally between the first conductive lines and the second conductive lines.

19. The anti-interference wiring assembly as claimed in claim 18, wherein the anti-interference wire is formed directly above the corresponding first conductive line.

20. The anti-interference wiring assembly as claimed in claim 19, wherein a distance between each of the anti-interference wires and the corresponding first conductive line is less than a shortest distance between the anti-interference wire and each of the second conductive lines.

* * * * *